(12) United States Patent
Merker et al.

(10) Patent No.: US 12,454,504 B2
(45) Date of Patent: Oct. 28, 2025

(54) PROCESS FOR THE RECOVERY OF A LIGHT BOILER AND A HEAVY BOILER FROM A VAPOR STREAM

(71) Applicant: Evonik Operations GmbH, Essen (DE)

(72) Inventors: Thorsten Merker, Erftstadt (DE); Christoph Hiller, Duelmen (DE)

(73) Assignee: Evonik Operations GmbH, Essen (DE)

( * ) Notice: Subject to any disclaimer, the term of this patent is extended or adjusted under 35 U.S.C. 154(b) by 218 days.

(21) Appl. No.: 18/256,136

(22) PCT Filed: Dec. 13, 2021

(86) PCT No.: PCT/EP2021/085344
§ 371 (c)(1),
(2) Date: Jun. 6, 2023

(87) PCT Pub. No.: WO2022/128834
PCT Pub. Date: Jun. 23, 2022

(65) Prior Publication Data
US 2024/0034710 A1    Feb. 1, 2024

(30) Foreign Application Priority Data

Dec. 18, 2020   (EP) .................................... 20215567

(51) Int. Cl.
*C07C 51/44*    (2006.01)
*B01D 3/14*    (2006.01)
(Continued)

(52) U.S. Cl.
CPC .............. *C07C 51/44* (2013.01); *B01D 3/143* (2013.01); *B01D 3/32* (2013.01); *B01D 3/346* (2013.01); *C07C 45/82* (2013.01)

(58) Field of Classification Search
CPC ..... C07C 51/44; C07C 45/82; B01D 3/14–42; B01D 3/346
See application file for complete search history.

(56) References Cited

U.S. PATENT DOCUMENTS 6,515,187 B1    2/2003    Schon et al.
2009/0299095 A1    12/2009    Briegel et al.
(Continued)

OTHER PUBLICATIONS

International Search Report and Written Opinion dated Mar. 25, 2022 in PCT/EP2021/085344 filed on Dec. 13, 2021, 13 pages.

*Primary Examiner* — Renee Robinson
(74) *Attorney, Agent, or Firm* — Oblon, McClelland, Maier & Neustadt, L.L.P.

(57) ABSTRACT

A process for the recovery of a light boiler and a heavy boiler from a vapor stream includes introducing a vapor stream comprising a light boiler and a heavy boiler into a column, withdrawing a vapor stream (3) enriched in the light boiler from the top of the column and a liquid stream (4) enriched in the heavy boiler from the bottom of the column. The stream (4) is split into a stream (5) and a stream (6). The stream (5) is recycled into the column and is not cooled during the recycling. A stream (7), enriched in a middle boiler, is withdrawn from the middle section of the column and is split into streams (8) and (9). The stream (9) is cooled in a heat exchanger and the cooled stream is recycled into the column below the top of the column. The streams (6) and (8) are withdrawn.

14 Claims, 5 Drawing Sheets

(51) Int. Cl.
*B01D 3/32* (2006.01)
*B01D 3/34* (2006.01)
*C07C 45/82* (2006.01)

(56) References Cited

U.S. PATENT DOCUMENTS

2014/0005437 A1* 1/2014 Zacchi .................. C07C 319/18
568/63
2015/0353460 A1* 12/2015 Boeck ................... C07C 45/783
568/476

* cited by examiner

PROCESS FOR THE RECOVERY OF A LIGHT BOILER AND A HEAVY BOILER FROM A VAPOR STREAM

CROSS REFERENCE TO RELATED APPLICATIONS

This application is a National Stage entry under 35 U.S.C. § 371 of PCT/EP2021/085344, filed on Dec. 13, 2021, and claims priority to European Patent Application No. 20215567.7, filed on Dec. 18, 2020, the entire contents of which are incorporated herein by reference.

The present invention relates to a process for the recovery of a light boiler and a heavy boiler from a vapor stream comprising said lighter boiler and said heavy boiler. Specifically, the process of the present invention allows for an improved recovery of heavy boilers, compared to the processes of the prior art. Preferably, the present invention relates to a process for the recovery of acrolein and acrylic acid from a vapor comprising acrolein and acrylic acid, with an improved recovery of acrylic acid, formed as a by-product in the oxidation of propene to acrolein.

On industrial scale, many organic products, such as ketones or aldehydes, are prepared by partial vapor phase oxidation of organic pre-cursor compounds. However, a major side reaction of the partial vapor phase oxidation of an organic compound is the oxidation of the desired product to a higher oxidized by-product, in particular of an aldehyde to a carboxylic acid. Therefore, the vapor stream from this oxidation reaction must be subjected to a purification process in order to obtain the desired product in the required purity. While the purification processes of the prior art, allow for a recovery of the desired product in at least acceptable purity, they typically fail to recover the by-product, in particular in a concentration, which would make its economic use attractive. However, the by-product can be a valuable material, as well, which gets lost because of the deficiencies of the purification processes of the prior art.

Figure 5:
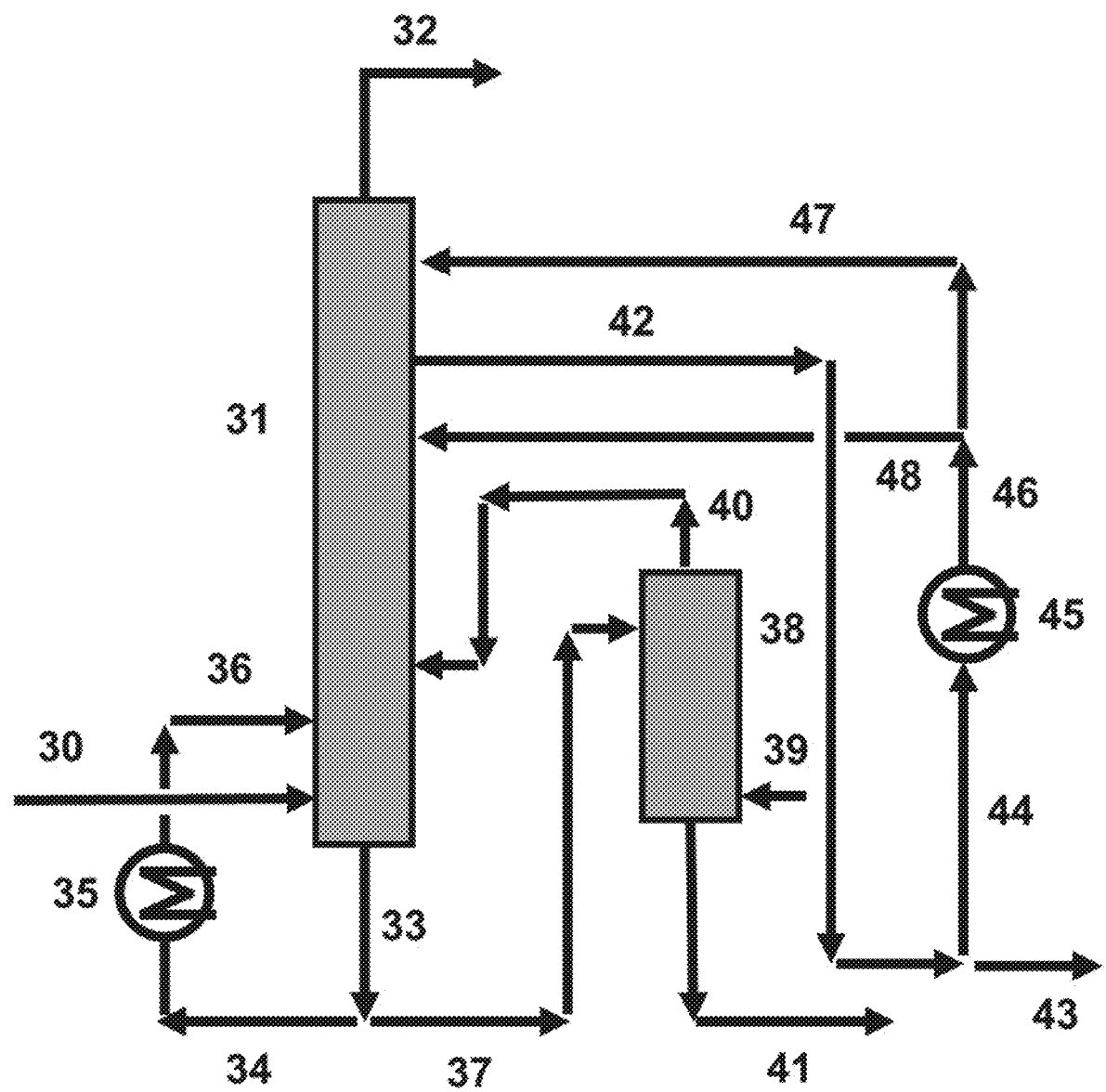

For example, on industrial scale acrolein is prepared by the selective oxidation of propene in the vapor phase in the presence of a heterogeneous catalyst. The major side reaction in this process is the oxidation of the desired product to acrylic acid. After exiting the reactor, the hot gaseous product stream is cooled down with water in a quench column. The functions of the quench column are to stop further reactions and to absorb the by-products from the gaseous product stream, thus facilitating the separation of the high boilers, mainly water and acrylic acid, from the reaction gas. A typical acrolein quench column of the prior art for the purification of acrolein is shown in FIG. 5 below. In a typical quench column of the prior art, the hot gas from the oxidation of propene enters the quench column in the sump section of the quench column and is cooled down by the recycled stream in a so-called sump pump-around via a heat exchanger. The thus obtained loaded water stream is fed to a stripping column, where it is stripped with recycle gas to recover absorbed acrolein. The remaining loaded water stream contains ca. 14 to 18 wt.-% of acrylic acid. In principle, the acrylic acid still contained in the loaded water stream represents a valuable material, which is worth to be recovered. However, the concentration of acrylic acid in said loaded water stream is relatively low. This makes the recovery of acrylic acid from the loaded waters stream unattractive on industrial scale. Therefore, the acrylic acid containing water stream is typically sent to a thermal oxidizer, which, however, represents in principle a loss in a valuable material.

Accordingly, there was a need for an improved process which in addition to the recovery of the light boiler also allows for an improved recovery of the heavy boiler.

It was found that this problem is solved in that the cooling of the sump pump-around in a purification process is switched off, so that the stream to be recycled back into the bottom of the column is kept essentially adiabatically. The recycling of the essentially adiabatically kept stream leads to a higher temperature in the sump of the column, compared to the processes of the prior art. Consequently, there is less condensation inside the column and thus a significantly reduced flow of condensed light and middle boilers back to the sump of the column. This leads to a concentration of the heavy boilers in the sump. The missing cooling by means of the sump pump-around is compensated by the cooling of the upper pump-around. This upper pump-around comprises the withdrawing of a stream (7) from the middle section of the column (2), the splitting of the stream (7) into a partial stream (8), which is withdrawn, and a partial stream (9), the cooling of the partial stream (9) in the heat exchanger (10) to provide the cooled stream (11) and the recycling of the stream (11) as stream (12) back into the column (2) at an introduction point below the top of said column.

Object of the present invention is therefore a process (A) for the recovery of a light boiler and a heavy boiler from a vapor stream, comprising the steps of A1) introducing a vapor stream (1) comprising a light boiler and a heavy boiler into a column (2) at a point at the bottom of said column, A2) withdrawing a vapor stream (3), enriched in the light boiler, from the top of the column (2), A3) withdrawing a liquid stream (4), enriched in the heavy boiler, from the bottom of the column (2), and splitting the stream (4) into a partial stream (5) and a partial stream (6), enriched in the heavy boiler, A4) recycling the stream (5) back into the column (2) at a point above the bottom of the column, wherein the stream (5) is kept essentially adiabatically during the recycling, A5) withdrawing a stream (7), enriched in a middle boiler, from the middle section of the column (2) and splitting the stream (7) into a partial stream (8) and a partial stream (9), A6) cooling the partial stream (9) in the heat exchanger (10) to provide the cooled stream (11) and recycling the stream (11) as stream (12) back into the column (2) at an introduction point below the top of said column, and A7) withdrawing the partial stream (6), enriched in the heavy boiler, and the partial stream (8), enriched in the middle boiler.

In the context of the present invention, the streams (4) and (5) form the sump pump-around and the streams (7), (9), (11) and (12) form the upper pump-around.

The partial stream (6) is enriched in the heavy boiler. Compared to the processes of the prior art, the process according to the present invention allows to increase the concentration of the heavy boiler, e.g. acrylic acid, in the partial stream (6). This is illustrated in the example according to the invention. The partial stream (8) is enriched in the middle boiler.

Figure 1:
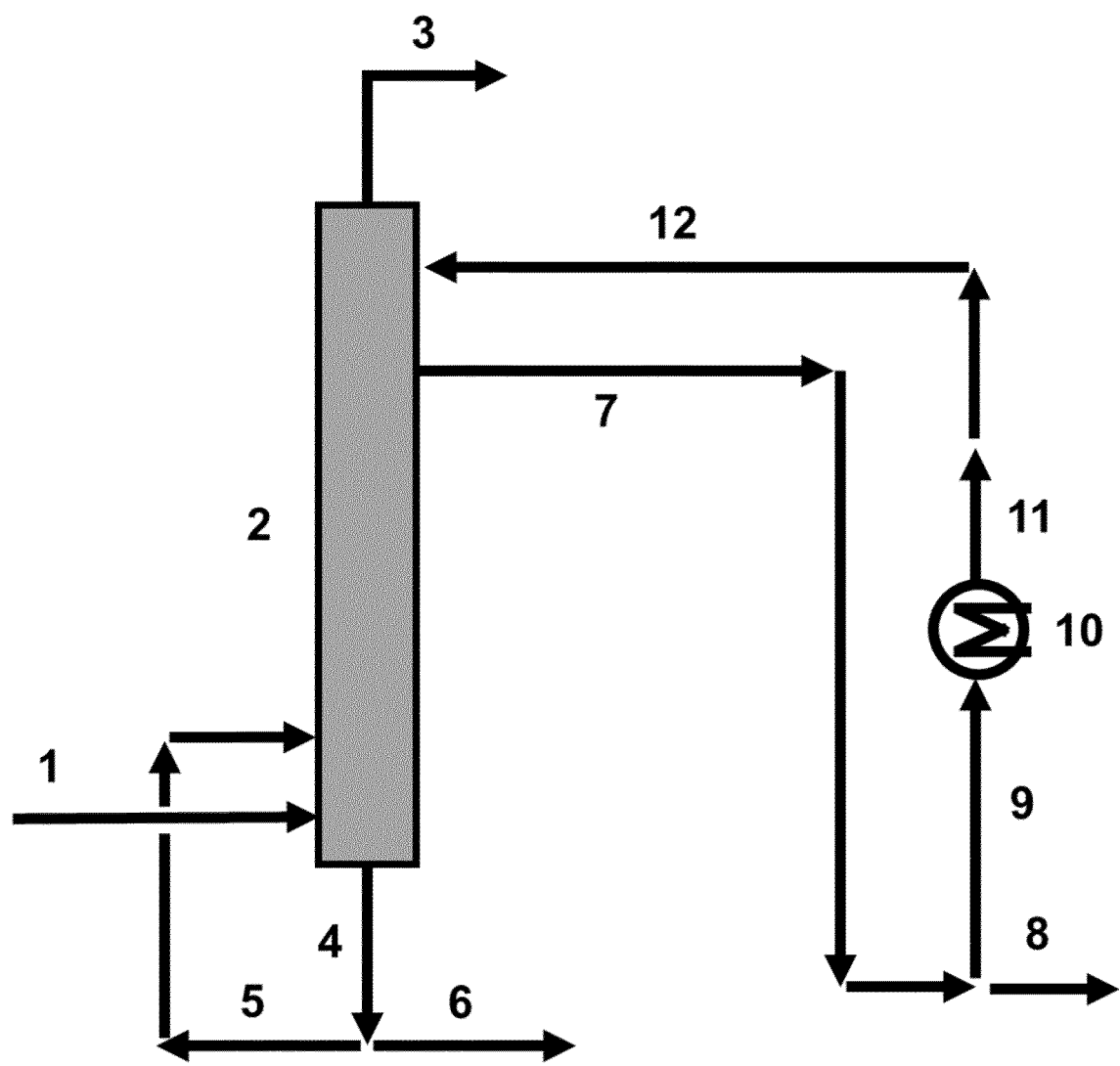

The process according to the present invention is also shown in FIG. 1 below.

According to the present invention the temperature of the stream (5), which is introduced into the column (2) in step A5), i.e. the temperature of the thus recycled stream (5), is kept essentially adiabatically. Thus, in contrast, to the process of the prior art, the heat exchanger for the sump pump-around, in which the stream (5) is recycled, is turned off completely or even missing completely in the process according to the present invention.

In the context of the present invention, the column (2) is preferably operated such that it has a quench part in its bottom, a distillation part in its middle section and another quench part in the top section.

In the context of the present invention, the term packing is used as known to the person skilled in the art of chemical engineering and denotes any type of random or structured packings, and plates or trays that are used to bring the vapor and the liquid phases inside a column into intimate contact.

In the context of the present invention, the introduction or recycling of a stream into a column involves the distribution of the stream in question, e.g. by means of a liquid distributor.

In the context of the present invention, the point where the stream (7) is withdrawn from the column (2) is also referred to as side withdraw of stream (7).

Inside the column (2), the middle boiling components and the heavy boiling components condense and flow downwards to the sump of the column. Mostly, the condensation of these components happens over the height of the packings in the column (2). It is therefore preferred to withdraw the stream (7) at the middle section of the packings in the column (2). This allows to use a liquid recycle stream in the upper pump-around.

In an embodiment of the process according to the present invention the stream (7) is withdrawn at the middle section of the packings in the column (2).

The more the cooling of the sump pump-around stream, i.e. the stream (5), is missing, the more the liquid portion inside the column (2) is shifted towards lower amounts. In other words, if the missing cooling of the sump pump-around stream was not compensated by the upper pump-around, no liquid streams (4) and (6) could be withdrawn from the bottom of the column (2). However, the upper pump-around realized in steps A5) and A6) of the process according to the present invention does not only compensate for the missing cooling of the sump pump-around, but it also allows to adjust the amount or volume of liquid stream (6) that is withdrawn as partial stream from the bottom or sump of the column (2). Preferably, the amount or volume of the stream (8) withdrawn as partial stream in step A7) equals the amount or volume of the stream (6) withdrawn in step A7).

In one embodiment of the process according to the present invention the amount of the stream (6) withdrawn in step A7) is adjusted by the amount of the stream (8) withdrawn in step A7).

The backflow of liquids, in particular middle boilers but also heavy boilers, inside the column (2) can be achieved in different ways. One option is that the middle section of the column (2) is provided with a liquid collector to withdraw stream (7), a liquid overflow and a liquid distributor so that any condensed liquid can flow back downwards to the sump of the column. In addition to or as an alternative to this option, it is also possible to allow for a backflow by splitting a partial stream (13) from the stream (11) and introducing said partial stream (13) into the column (2) at a lower point than the side withdraw of stream (7). After being introduced into the column (2), said stream (13) flows downwards to the sump of the column. In principle, it is also possible to split optional further partial streams from the stream (11) and to introduce them analogue to partial stream (13) into the column (2).

In another embodiment, also shown in FIG. 2 below, the process according to the present invention further comprises the steps of
B1) splitting at least one additional partial stream (13) from the stream (11), and
B2) introducing the stream (13) into the column (2) at a lower point of the column (2) than the point where the stream (7) is withdrawn.

The streams (12) and (13) are liquid streams. Therefore, they flow downwards through the column (2) after their introduction into said column.

In a further embodiment of the process according to the present invention the stream (12) and/or the stream (13) after being introduced into column (2) is/are led in counter-flow to the rising vapor.

In the context of the present invention, the term rising vapor is used as known to the expert in chemical engineering and denotes the rising vapor primarily comprising the light boiler.

In the embodiment, where the process according to the present invention further comprises the steps B1) and B2), the stream (12) is introduced into the column (2) at a higher point than the point where the stream (7) is withdrawn and the stream (13) is introduced at a lower point than the withdrawn stream (7).

According to the present invention a liquid stream (4), enriched in the heavy boiler, is withdrawn from the bottom of column (2), and from said stream (4) a partial stream (6) is split and then withdrawn. In principle, this partial stream (6) can be subjected to a further processing of the heavy boiler, contained therein. However, prior to this, it is preferred to subject the partial stream (6) to an additional purification step (C), in which any residual light boiler is removed from this stream. This purification step is preferably done in a column (14), preferably a strip column, using a purge gas stream (15) for removing any light boiler to give a light boiler comprising stream (16), which is withdrawn from the column (14) and recycled back to the column (2), and a stream (17) depleted in the light boiler, which after being withdrawn from the column (14) can be subjected to a further processing.

In another embodiment, also shown in FIG. 3 below, the process according to the present invention further comprises the steps of
C1) introducing the stream (6) into a column (14) at a point below the top of said column,
C2) purging the stream (6) with a gas stream (15) inside the column (14) to recover residual light boiler from the stream (6),
C3) withdrawing a light boiler comprising stream (16) from the top of the column (14) and introducing said stream (16) into the column (2) at a point above the bottom of said column, and
C4) withdrawing a stream (17) depleted in the light boiler from the bottom of the column (14).

According to the present invention the stream (7) is withdrawn from the middle section of the column (2)—preferably it is withdrawn at the height of the packings in the column (2)—and split into a partial stream (8) and a partial stream (9), wherein the latter partial stream is first cooled and then recycled back into the column at an introduction point below the top of said column. Therefore, the stream (7) and the partial stream (8) typically contain the middle boiling components of the vapor stream (1). When the one or more middle boilers represents valuable materials, the partial stream (8) can be fed to another production process. However, prior to this, it is preferred to subject the partial stream (8) to an additional purification step (D), in which any residual light boiler is removed from this stream. This purification step is preferably done in a column (18), preferably strip column, using a purge gas stream (19) for removing any light boiler to give a light boiler comprising stream (20), which is withdrawn from the column (18), and a stream (21) depleted in the light boiler, which after being withdrawn from the column (18) can be subjected to a further processing. The light boiler comprising stream (20) can be recycled back to the column (2) and introduced into said column at a point above the bottom of said bottom. Alternatively, the stream (20) can be sent to an incineration.

In a further embodiment, also shown in FIG. 4 below, the process according to the present invention further comprises the steps of D1) introducing the stream (8) into a column (18) at a point below the top of said column, D2) purging the stream (8) with a gas stream (19) inside the column (18) to recover residual light boiler from the stream (8), D3) withdrawing a light boiler comprising stream (20) from the top of the column (18), and D4) withdrawing a stream (21) depleted in the light boiler from the bottom of the column (18).

In principle, the process according to the present invention is not limited regarding the origin and the composition of the vapor stream (1) of step A1), provided said vapor stream comprises a light boiler and a heavy boiler.

Notwithstanding, it is preferred that the vapor stream (1) is from the oxidation of an organic compound selected from the group consisting of an olefin, an aliphatic alcohol, an aliphatic aldehyde, an allylic alcohol, an allylic aldehyde and an allylic ketone.

Preferably, the vapor stream (1) is from the oxidation of propene to acrolein, with acrylic acid being the major side-product.

In an embodiment of the process according to the present invention, the light boiler comprises or consists of acrolein and the heavy boiler comprises or consists of acrylic acid.

In addition to acrylic acid, which is the dominant heavy boiler in the context of the present invention, the heavy boiler may also comprise water, and other heavy boiling components, however, only in minor amounts, specifically, allyl acrylate, allyl alcohol, and acetic acid.

Prior to being subjected to the process according to the present invention, the hot vapor stream from the oxidation of propene to acrolein is first cooled at the end of the reactor and after the reactor, it is quenched with water in order to stop any further reactions, in particular an oxidation of the formed acrolein.

In another embodiment of the process according to the present invention the vapor stream (1) also comprises water. The said water condenses in the column (2), specifically at the height of the packings in the middle section of the column (2). It is therefore also present in the stream (7).

In a preferred embodiment of the process according to the present invention, the stream (7) withdrawn in step A5) comprises water.

In addition to water, the stream (7) may also comprise minor amounts of light boilers, such as remainders of acrolein, formaldehyde and acetaldehyde, and also minor amounts of heavy boilers, such as acrylic acid.

Due to the essentially adiabatically kept stream (5), the process according to the present invention leads to higher temperatures in the bottom or sump of the column (2), compared to the processes of the prior art. For example, when the vapor stream (1) originates from the oxidation of propene, and thus comprises acrolein as a light boiler and acrylic acid as a heavy boiler, the following temperature changes are observed in the column (2): The temperature in the bottom or sump is increased from ca. 65° C. (processes of the prior art) to a temperature in the range from ca. 70 to 85° C., preferably a temperature of more than 70° C., e.g. ranging from more than 70 to 85° C., or at least 75° C., e.g. ranging from 75 to 85° C., or in particular a temperature in the range from 80 to 85° C. Consequently, the stream (4), that is withdrawn from the bottom or sump of the column (2), and the stream (5), which is split from the stream (4) and kept essentially adiabatically during the recycling back into the column (2), also have a temperature in the range from 70 to 85° C. As a further consequence of the essentially adiabatic keeping of the stream (5), there is also a temperature increase at the level of the packings in the column (2): The temperature is increased from ca. 48° C. (processes of the prior art) to a temperature in the range from 50 to 70° C.

In a preferred embodiment of the process according to the present invention, the temperature in the bottom of the column (2) is in the range from 70 to 85° C.

In another preferred embodiment of the process according to the present invention, the temperature of the stream (5) is in the range from 70 to 85° C.

One should expect that the missing cooling of the sump would also result in a significant temperature increase at the top of the column (2). However, there is only a very small temperature increase at the most or even no temperature increase at all at the top of the column (2) because of the upper pump-around realized in steps A5) and A6) of the process according to the present invention. Specifically, this effect is achieved in that the stream (11), which is subsequently introduced as partial stream (12), preferably also as partial stream (13) and any optional further partial streams, is cooled to a temperature of 20° C. at the most, preferably to a temperature in the range from 10 to 20° C.

In a further preferred embodiment of the process according to the present invention, the stream (11) has a temperature of 20° C. at the most.

The process according to the present invention is further illustrated by the FIGS. 1 to 5 and the example.

FIG. 1 is a schematic representation of the process according to claim 1, where the numbers have the following meanings (1) vapor stream comprising a light boiler and a heavy boiler, (2) column, (3) vapor stream enriched in the light boiler, and withdrawn from the top of the column (2), (4) liquid stream enriched in the heavy boiler, and withdrawn from the bottom of the column (2), (5) partial stream, split from stream (4) and recycled into the column (2), (6) partial stream, split from stream (4), and withdrawn from the process, (7) stream withdrawn from the middle section of column (2), (8) partial stream, split from stream (7), (9) partial stream, split from stream (7), and fed to cooling,

(10) heat exchanger,

(11) cooled stream,

(12) recycled cooled stream.

Figure 2:
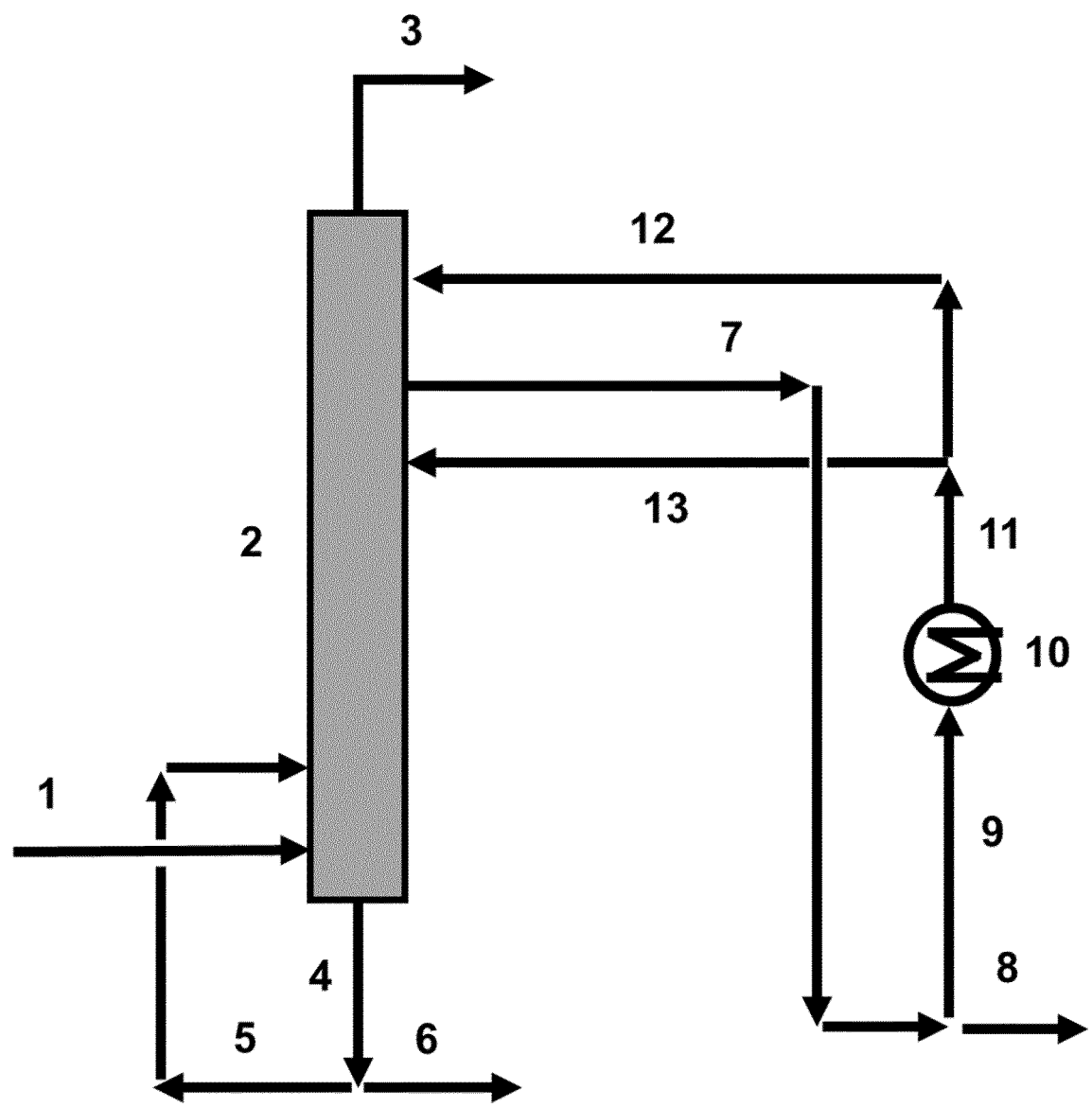

FIG. 2 is a schematic representation of the process according to the embodiment of claim 4, where the numbers have the following meanings (1) vapor stream comprising a light boiler and a heavy boiler,
(2) column,
(3) vapor stream enriched in the light boiler, and withdrawn from the top of the column (2),
(4) liquid stream enriched in the heavy boiler, and withdrawn from the bottom of the column (2),
(5) partial stream, split from stream (4) and recycled into the column (2),
(6) partial stream, split from stream (4), and withdrawn from the process,
(7) stream withdrawn from the middle section of column (2),
(8) partial stream, split from stream (7),
(9) partial stream, split from stream (7), and fed to cooling,
(10) heat exchanger,
(11) cooled stream,
(12) recycled partial stream, split from cooled stream (11),
(13) recycled partial stream, split from cooled stream (11).

Figure 3:
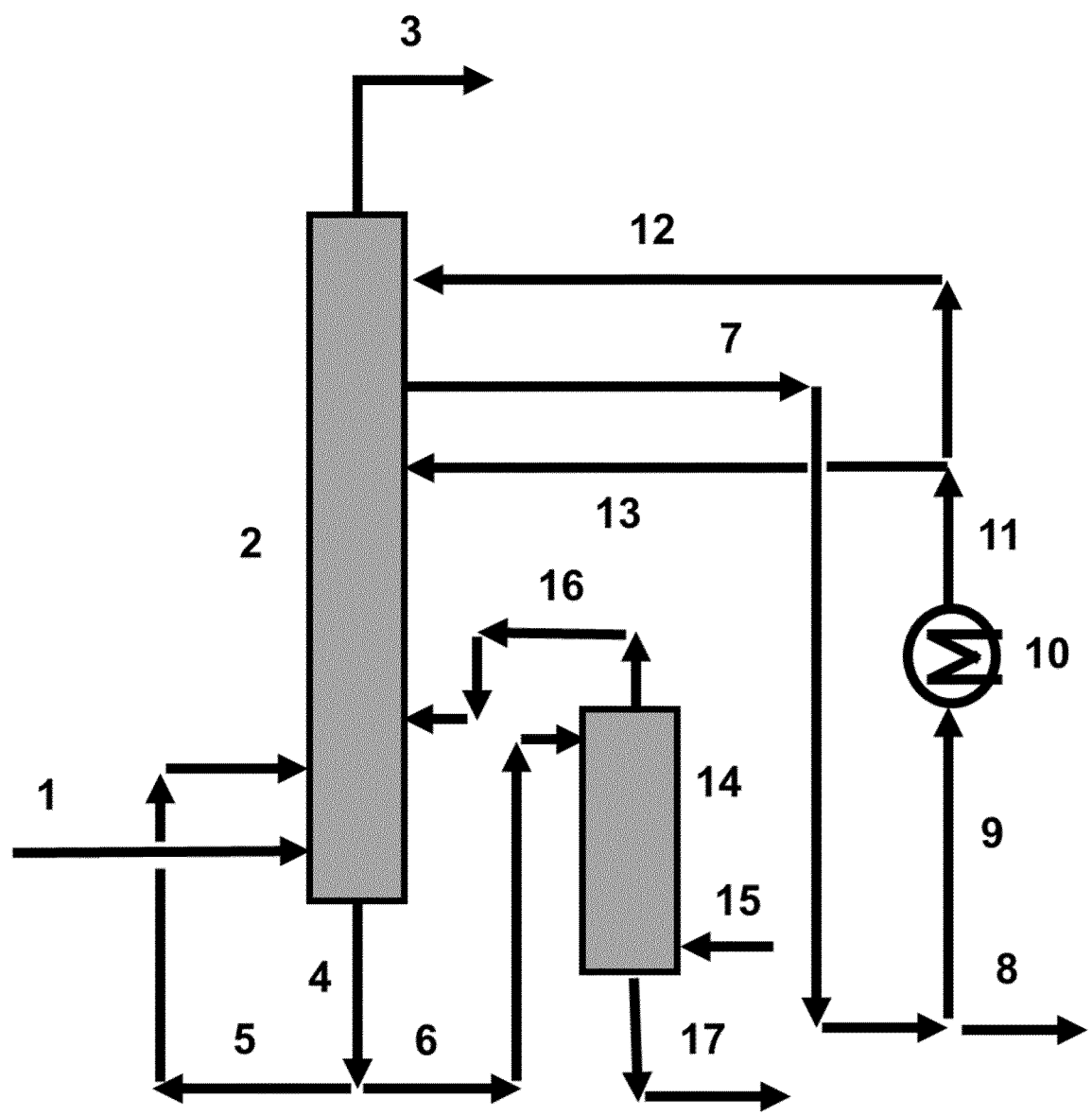

FIG. 3 is a schematic representation of the process according to the embodiment of claim 7, where the numbers have the following meanings (1) vapor stream comprising a light boiler and a heavy boiler,
(2) column,
(3) vapor stream enriched in the light boiler, and withdrawn from the top of the column (2),
(4) liquid stream enriched in the heavy boiler, and withdrawn from the bottom of the column (2),
(5) partial stream, split from stream (4) and recycled into the column (2),
(6) partial stream, split from stream (4), and withdrawn from the process,
(7) stream withdrawn from the middle section of column (2),
(8) partial stream, split from stream (7),
(9) partial stream, split from stream (7), and fed to cooling,
(10) heat exchanger,
(11) cooled stream,
(12) recycled partial stream, split from cooled stream (11),
(13) recycled partial stream, split from cooled stream (11),
(14) column,
(15) gas stream for purging stream (6),
(16) light boiler comprising stream, withdrawn from the top of column (14),
(17) stream depleted in the light boiler, withdrawn from the bottom of the column (14).

Figure 4:
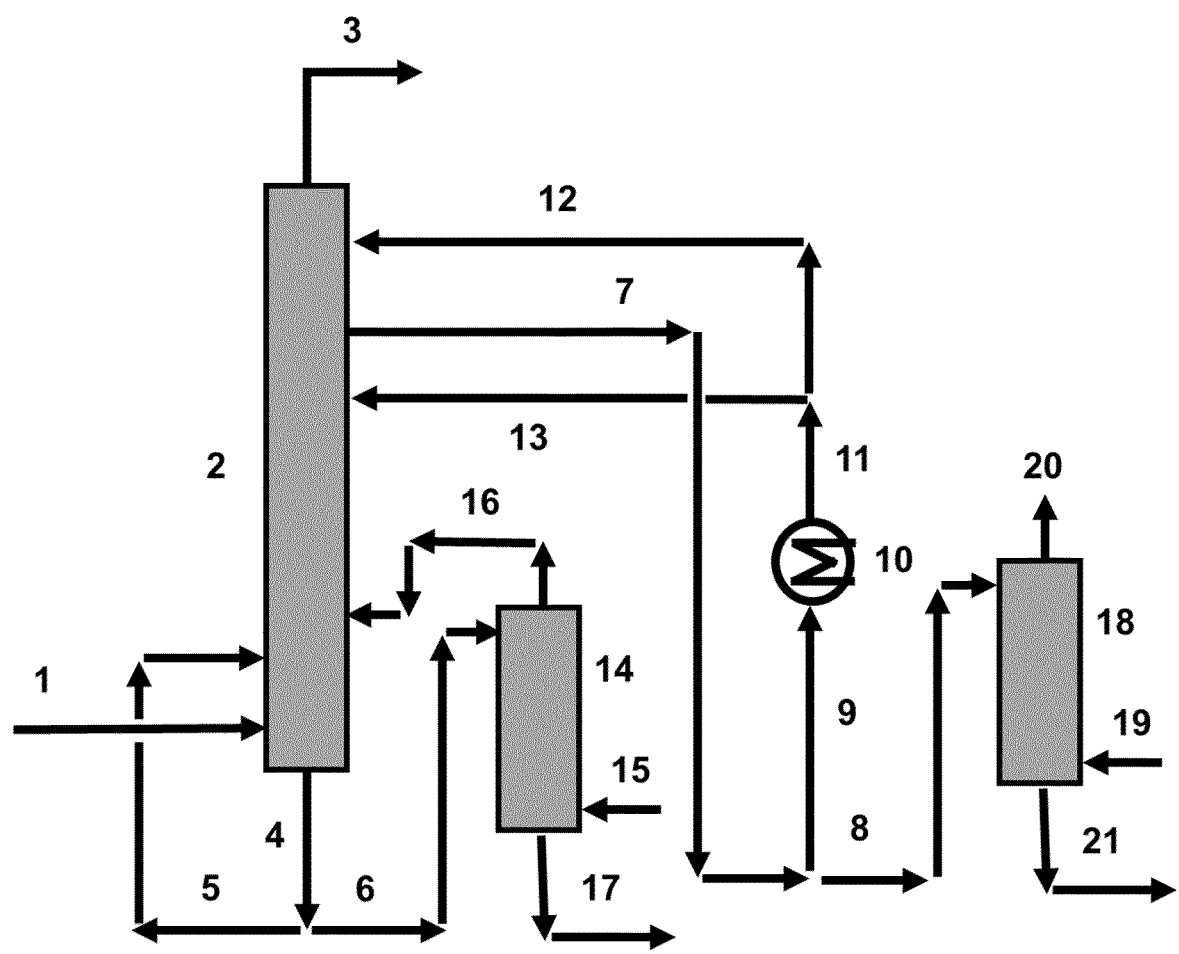

FIG. 4 is a schematic representation of the process according to the embodiment of claim 8, where the numbers have the following meanings (1) vapor stream comprising a light boiler and a heavy boiler,
(2) column,
(3) vapor stream enriched in the light boiler, and withdrawn from the top of the column (2),
(4) liquid stream enriched in the heavy boiler, and withdrawn from the bottom of the column (2),
(5) partial stream, split from stream (4) and recycled into the column (2),
(6) partial stream, split from stream (4), and withdrawn from the process,
(7) stream withdrawn from the middle section of column (2),
(8) partial stream, split from stream (7),
(9) partial stream, split from stream (7), and fed to cooling,
(10) heat exchanger,
(11) cooled stream,
(12) recycled partial stream, split from cooled stream (11),
(13) recycled partial stream, split from cooled stream (11),
(14) strip column,
(15) gas stream for purging stream (6),
(16) light boiler comprising stream, withdrawn from the top of the strip column (14),
(17) stream depleted in the light boiler, withdrawn from the bottom of the strip column (14),
(18) strip column,
(19) gas stream for purging stream (8),
(20) light boiler comprising stream, withdrawn from the top of the strip column (18),
(21) stream depleted in the light boiler, withdrawn from the bottom of the strip column (14), FIG. 5 is a schematic representation of a process according to the prior art, where the numbers have the following meanings

(30) vapor stream comprising a light boiler and a heavy boiler,
(31) column,
(32) vapor stream enriched in the light boiler, and withdrawn from the top of the column (31),
(33) liquid stream enriched in the heavy boiler, and withdrawn from the bottom of the column (31),
(34) partial stream, split from stream (33) and recycled into the column (31),
(35) heat exchanger for cooling of stream (34),
(36) cooled stream (34),
(37) partial stream, split from stream (33),
(38) strip column,
(39) gas stream for purging stream (6),
(40) light boiler comprising stream, withdrawn from the top of the strip column (38),
(41) stream depleted in the light boiler, withdrawn from the bottom of the strip column (28),
(42) stream withdrawn from the middle section of column (31),
(43) partial stream, split from stream (42),
(44) partial stream, split from stream (42), and fed to cooling,
(45) heat exchanger,
(46) cooled stream,
(47) partial stream, split from cooled stream (42),
(48) partial stream, split from cooled stream (42),

EXAMPLES

The examples herein are performed using a computation model of a process based on the process shown in FIG. 3 (example according to the invention) and in FIG. 5 (comparative example). Process modeling is an established and reliable methodology used by engineers to simulate complex chemical processes before building the real plant. In the context of the examples herein the commercial modeling software Aspen Plus® (Aspen Technology, Inc., 20 Crosby Roads, Bedford, Massachusetts 01730, USA) was used in combination with physical property data from public databases.

COMPARATIVE EXAMPLE

For illustrating the benefits of the process according to the present invention, the purification of an acrolein comprising stream was simulated for the process shown in the schematic representation of FIG. 5. The acrolein comprising gas stream (30) entered the column (31) in the sump section and was cooled down by the sump pump-around (comprised of streams 33, 34 and 36) via the heat exchanger (35). The waste water (high boilers), stream (37), was sent to a recycle gas stripper, second column (38), to recover acrolein. The waste water from the recycle gas stripper, stream (41), was sent to a waste water vessel via a pump (not shown). The hot gas in column (31) was cooled down further via the upper pump-around, comprised of streams (42), (44), and (46) to (48), by the heat exchanger (45). The stream (32), enriched in acrolein, was withdrawn from the top of the column, and sent to the absorber for further processing (not shown). The stream (33) withdrawn from the bottom of the column (31) contained 18.350 wt.-% of acrylic acid. The total composition of the stream (33) is given in Table 1 below.

EXAMPLE ACCORDING TO THE INVENTION

Using the modeling software Aspen Plus®, the purification of an acrolein comprising stream is simulated for the process shown in the schematic representation of FIG. 3. The acrolein comprising gas stream (1) entered the column (2) in the sump section. In contrast to the comparative example, the sump pump-around (comprised of streams (4) and (5)) was not cooled but kept essentially adiabatically. The waste water (high boilers), stream (6), was sent to a recycle gas stripper, second column (14), to recover acrolein. The waste water from the recycle gas stripper, stream (17), was sent to a waste water vessel via a pump (not shown). The hot gas in column (2) was cooled down via the upper pump-around, comprised of streams (7), (9) and (11) to (12), by the heat exchanger (10). The stream (3), enriched in acrolein, was withdrawn from the top of the column, and sent to the absorber for further processing (not shown). The stream (4) withdrawn from the bottom of the column (2) contained 51.635 wt.-% of acrylic acid, which is almost 3 times as in the stream (33) of the comparative example. The total composition of the stream (6) is given in Table 1 below.

TABLE 1

Comparison of the composition of the streams (6) and (33).

| Components | Comparative Example Stream (33) [wt.-%] | Example according to the invention Stream (6) [wt.-%] |
|---|---|---|
| water | 77.056 | 37.762 |
| acrolein | 0.493 | 0.238 |
| acrylic acid | 18.350 | 51.635 |
| 2-ethanol | 0.119 | 1.029 |
| formaldehyde | 2.873 | 5.520 |
| acetaldehyde | 0.013 | 0.004 |
| allyl alcohol | 0.023 | 0.044 |
| allyl acrylate | 0.002 | 0.019 |
| acetic acid | 1.035 | 3.631 |
| others | 0.036 | 0.118 |

The invention claimed is:

1. A process for recovery of a light boiler and a heavy boiler from a vapor stream, comprising:
    A1) introducing a vapor stream (1) comprising a light boiler and a heavy boiler into a column (2) at a point at the bottom of the column,
    A2) withdrawing a vapor stream (3), enriched in the light boiler, from the top of the column (2),
    A3) withdrawing a liquid stream (4), enriched in the heavy boiler, from the bottom of the column (2), and splitting the stream (4) into a partial stream (5) and a partial stream (6), enriched in the heavy boiler,
    A4) recycling the partial stream (5) back into the column (2) at a point above the bottom of the column, wherein the partial stream (5) is not cooled during the recycling,
    A5) withdrawing a stream (7), enriched in a middle boiler, from a middle section of the column (2) and splitting the stream (7) into a partial stream (8) and a partial stream (9),
    A6) cooling the partial stream (9) in a heat exchanger (10) to provide a cooled stream (11) and recycling the cooled stream (11) as stream (12) back into the column (2) at an introduction point below the top of said column, and
    A7) withdrawing a volume of the partial stream (6) and withdrawing a volume of the partial stream (8),
        wherein the volume of the partial stream (8) withdrawn is equal to the volume of the partial stream (6) withdrawn and the flow of partial stream (5) is maintained.

2. The process according to claim 1, wherein the stream (7) is withdrawn at a middle section of the column (2) which contains packings.

3. The process according to claim 1, further comprising:
    B1) splitting at least one additional partial stream (13) from the cooled stream (11), and
    B2) introducing the additional partial stream (13) into the column (2) at a lower point of the column (2) than a point where the stream (7) is withdrawn.

4. The process according to claim 3, wherein the stream (12) and/or the additional partial stream (13) after being introduced into column (2) is/are led in counter-flow to the rising vapor.

5. The process according to claim 3, wherein the stream (12) is introduced into the column (2) at a higher point than the point where the stream (7) is withdrawn and the additional partial stream (13) is introduced at a lower point than the withdrawn stream (7).

6. The process according to claim 1, further comprising:
    C1) introducing the partial stream (6) into a heavy boiler purification column (14) at a point below the top of said heavy boiler purification column,
    C2) purging the partial stream (6) with a gas stream (15) inside the column (14) to recover residual light boiler from the partial stream (6),
    C3) withdrawing a light boiler comprising stream (16) from the top of the column (14) and introducing said stream (16) into the column (2) at a point above the bottom of said column, and
    C4) withdrawing a stream (17) depleted in the light boiler from the bottom of the column (14).

7. The process according to claim 1, further comprising:
    D1) introducing the partial stream (8) into a middle boiler purification column (18) at a point below the top of said middle boiler purification column (18),
    D2) purging the partial stream (8) with a gas stream (19) inside the column (18) to recover residual light boiler from the partial stream (8),
    D3) withdrawing a light boiler comprising stream (20) from the top of the column (18), and
    D4) withdrawing a stream (21) depleted in the light boiler from the bottom of the column (18).

8. The process according to claim 1, wherein the vapor stream (1) is from oxidation of an organic compound selected from the group consisting of an olefin, an aliphatic alcohol, an aliphatic aldehyde, an allylic alcohol, an allylic aldehyde, and an allylic ketone.

9. The process according to claim 8, wherein the stream (7) withdrawn in A5) comprises water.

10. The process according to claim 1, wherein the light boiler comprises acrolein and the heavy boiler comprises acrylic acid.

11. The process according to claim 10, wherein a temperature in the bottom of the column (2) is in a range from 70 to 85° C.

12. The process according to claim 11, wherein the temperature of the stream (5) is maintained at the temperature of the bottom of the column (2).

13. The process according to claim 10, wherein the stream (11) has a temperature of 20° C. or less.

14. The process according to claim 1, wherein the vapor stream (1) further comprises water.

\* \* \* \* \*